Patented Nov. 28, 1950

2,531,469

UNITED STATES PATENT OFFICE 2,531,469

POLYVINYL SULFONATES AND PROCESS FOR PREPARING THE SAME

Delbert D. Reynolds and William O. Kenyon, Rochester, N. Y., assignors to Eastman Kodak Company, Rochester, N. Y., a corporation of New Jersey No Drawing. Application April 14, 1949, Serial No. 87,576

11 Claims. (Cl. 260—79.3)

This invention relates to polyvinyl sulfonates and to a process for preparing such polyvinyl sulfonates.

The reaction of sulfonyl chlorides with the simpler alcohols is well known. This reaction has also been applied to the preparation of various cellulose esters such as cellulose p-toluene sulfonate, cellulose methane sulfonate, and the like. The reaction has also been employed for the preparation of sulfonates of hydrolyzed interpolymers of ethylene and a vinyl organic ester. However, this reaction as carried out by such prior art processes does not give good results when applied to the sulfonation of polyvinyl alcohol. For example, when the sulfonation of polyvinyl alcohol is attempted by the process described in the aforementioned prior art for the sulfonation of hydrolyzed interpolymers of ethylene and a vinyl organic ester, substantially no sulfonation of the polyvinyl alcohol occurs. In the Journal of Ind. & Eng. Chemistry 41, pp. 617-621 (1949), E. F. Izard and P. W. Morgan describe a process for preparing polyvinyl p-toluene sulfonate by heating a mixture of p-toluene sulfonyl chloride and a suspension of polyvinyl alcohol in pyridine to a temperature of 65° C., until the mixture becomes clear and homogeneous. The product they obtained by analysis contained 9.05% by weight of sulfur, equivalent to only 56% by weight of vinyl p-toluene sulfonate units or 22 mol per cent substitution of hydroxyl groups by p-toluene sulfonate groups. We found that sulfonation of polyvinyl alcohol in the presence of pyridine at temperatures appreciably above 20° C. favored side reactions which resulted in inferior sulfonated products and extremely low yields of such sulfonated products. These side reactions we found were (1) the reaction of vinyl sulfonate units with the formed pyridine hydrochloride to form vinyl chloride units; (2) the reaction of vinyl sulfonate units with pyridine to form quaternized units; and (3) the intramolecular reaction of vinyl sulfonate units with a vinyl alcohol unit to form tetrahydropyrane type rings. The side reactions can be illustrated by the following equations:

(1)

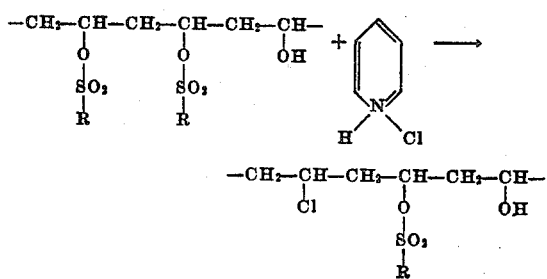

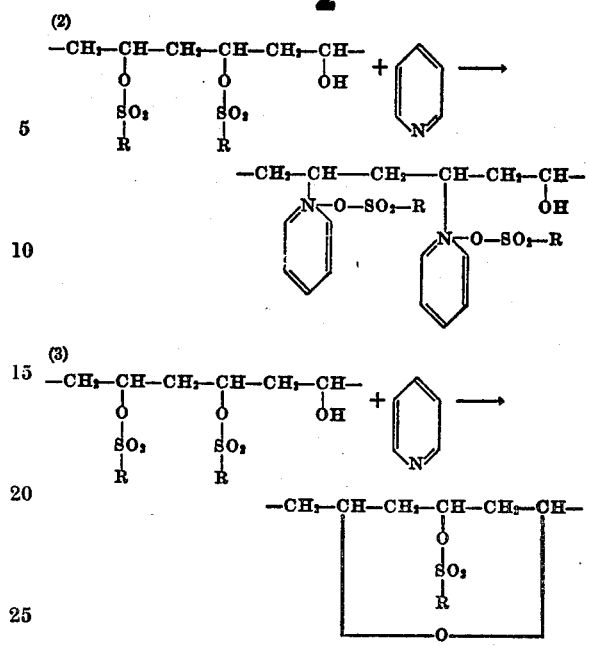

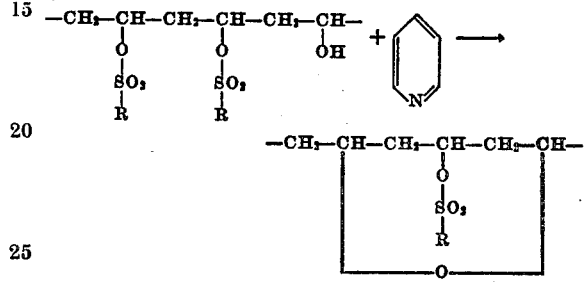

The preparation of quaternary salts by reaction of a tertiary amine on the polyvinyl sulfonates of the invention as illustrated in above side reaction (2) is described and claimed in our copending application Serial No. 87,577, filed of even date herewith.

We have now found that the disadvantages of the prior art processes can be overcome by first dissolving the polyvinyl alcohol in a solvent for the polyvinyl alcohol to a homogeneous solution, then precipitating the solution into a non-solvent for the treated polyvinyl alcohol and then sulfonating the treated and precipitated polyvinyl alcohol.

It is, accordingly, an object of the invention to provide high quality polyvinyl sulfonates. Another object is to provide a process for preparing such polyvinyl sulfonates. Other objects will become apparent hereinafter.

In accordance with the invention, polyvinyl sulfonates characterized by the fundamental vinyl sulfonate unit

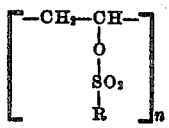

repeated $n$ times, and wherein R represents an alkyl group (e. g., methyl, ethyl, propyl, butyl, etc.), an aryl group (e. g., phenyl, tolyl, naphthyl, etc.) a p-nitrophenyl group, a p-bromophenyl group and an aralkyl group (e. g., benzyl, phenylethyl, etc.), can be prepared by the process of first dissolving the polyvinyl alcohol in water or in an alkyl or aryl sulfonic acid (e. g., in methane sulfonic acid, in ethane sulfonic acid, in propane sulfonic acid, in butane sulfonic acid, benzene sulfonic acid, etc.) or in a mixture in any proportions of water and the sulfonic acid, followed by precipitating the solution thus obtained in a non-solvent for the treated polyvinyl alcohol (e. g., pyridine, acetone, ether, dioxane, mixtures of pyridine with acetone, with ether or with dioxane, and the like solvents and mixtures), the treated polyvinyl alcohol coming out of solution thereby in the form of particles or as a fibrous precipitate, then sulfonating the isolated precipitate of polyvinyl alcohol in fresh pyridine with an organic sulfonating agent and then separating the polyvinyl sulfonate which forms from the reaction mixture by pouring the latter into ice water, followed by separating and washing the precipitated polyvinyl sulfonate. The process is equally efficacious for the preparation of polyvinyl sulfonates irrespective of whether R in the above formula is alkyl, aryl or aralkyl. The above defined polyvinyl sulfonates are valuable intermediates for the preparation of other useful resinous compounds. Thus, they can be converted to the amino derivatives by reacting them with a primary or secondary amine, the reaction being one of replacing the sulfonic acid groups completely or only partially with amino groups depending on the reaction conditions employed.

Suitable sulfonating agents include alkyl sulfonyl chlorides (e. g. methane sulfonyl chloride, ethane sulfonyl chloride, propane sulfonyl chloride, butane sulfonyl chloride, etc.) or aryl sulfonyl chlorides (e. g. benzene sulfonyl chloride, p-toluene sulfonyl chloride, p-nitrobenzene sulfonyl chloride, p-bromobenzene sulfonyl chloride, α-naphthalene sulfonyl chloride, β-naphthalene sulfonyl chloride, etc.). The amount of sulfonating agent can be varied advantageously from just enough of the agent to react with all of the hydroxyl groups of the polyvinyl alcohol and with any water which may be present to a considerable excess, but preferably for efficient operation from 1 to 3 gram moles of the sulfonating agent to each mole (44 grams) of polyvinyl alcohol. The temperature range employed for the sulfonation step is within the critical limits of 0° and 20° C. As previously mentioned, above 20° C. side reactions interfere seriously with the sulfonation process, while at temperatures below 0° C. the reaction is too slow for practical operation. The preferred temperature range for the sulfonation step is from 5° to 15° C. Although not critical, advantageously the proportion of pyridine to the polyvinyl alcohol and the sulfonating agent in the sulfonating step can be varied from 10 to 20 parts by weight of pyridine to each part by weight of the reactants. However, the only real limitation is that if the solids are too highly concentrated, the final solution containing the polyvinyl sulfonate dissolved therein will be too viscous for efficient operation. In the pretreatment step, wherein the polyvinyl alcohol starting material is dissolved in water or in an alkyl or aryl sulfonic acid or in a mixture of water and the sulfonic acid, the proportion of the polyvinyl alcohol to the solvent is not critical except that the solution should not be so concentrated and viscous as to be difficult to handle efficiently in the precipitation step. Advantageously, one part by weight of polyvinyl alcohol is dissolved in from 10 to 20 parts by weight of the solvent. The actual dissolving of the polyvinyl alcohol in water or in water containing a lesser amount of an alkyl or aryl sulfonic acid is facilitated by heating the mixture, for example, on a steam bath until a homogeneous solution is obtained. Where the polyvinyl alcohol is dissolved in a concentrated alkyl or aryl sulfonic acid, it is not necessary to heat the mixture to obtain a uniform solution. The solution of polyvinyl alcohol is advantageously precipitated into a considerably larger volume of pyridine, but this is not critical as to the upper limit, since any quantity of pyridine will be operable which is capable of giving well-defined and non-adhering precipitated particles or fibers of the treated polyvinyl alcohol.

The following examples will serve further to illustrate the polyvinyl sulfonates of the invention and the manner of preparing the same.

*Example 1*

44 grams of polyvinyl alcohol were dissolved by stirring in 500 cc. of distilled water which was heated on a steam bath. The solution thus formed was filtered and then poured slowly into pyridine. The fibrous precipitate which formed was extracted with pyridine for a period of 4 hours in a Soxhlet extractor. The extracted polymer was then reacted with 200 grams of methane sulfonyl chloride in a flask equipped with a stirrer, a thermometer and a dropping funnel, the temperature being maintained at 0° to 10° C. while the methane sulfonyl chloride was added dropwise with continuous stirring. After 7 hours at 0° to 10° C., the reaction mixture was poured into ice water, the polyvinyl methane sulfonate which separated being leached in water and then air-dried. The dried polymer was dissolved in moist acetone and reprecipitated in water, and again leached in water and dried. Analysis of the final product gave by weight 23.8% sulfur and approximately 1% chloride. This result indicated that the product contained 91.5% by weight of vinyl methane sulfonate units equivalent to approximately 80 mol percent.

*Example 2*

44 grams of polyvinyl alcohol were dissolved by heating with 800 cc. of water on a steam bath. The polyvinyl alcohol was precipitated by pouring the above aqueous solution into 3 liters of a 1:1 acetone-pyridine mixture. It was then leached in one liter of pyridine. After removing most of the pyridine by centrifuging, the precipitated and washed polyvinyl alcohol was again leached in 500 cc. of pyridine, and again centrifuged. The so treated and swollen polyvinyl alcohol was then added to 1500 cc. of pyridine and the mixture cooled to 5° to 10° C. While maintaining this temperature and stirring, two moles of p-toluene sulfonyl chloride were added. Stirring was continued while maintaining a reaction temperature not exceeding 15° C., for a period of 24 hours. The reaction mixture was then diluted with one liter of acetone and poured slowly into water. The white, fibrous polyvinyl p-toluene sulfonate which precipitated was washed with water and dried. Analysis gave 15.9% of S equivalent to 98% by weight of vinyl p-toluene sulfonate units or 92 mol per cent. The chlorine content was less than 1% by weight.

*Example 3*

22 grams of polyvinyl alcohol were dissolved by stirring with 150 cc. of methane sulfonic acid which was cooled in an ice-water bath. The viscous dope thus formed was poured into cooled pyridine and the precipitate which formed was separated from the liquid. The precipitate was then placed into a modified Soxhlet type extractor and the pyridine salt of methane sulfonic acid which formed as a by-product was extracted therefrom with fresh pyridine. The extracted polyvinyl alcohol now in a swollen state was mixed with fresh pyridine, the mixture placed in a 3-necked flask equipped with a mechanical stirrer, a thermometer and a dropping funnel. The mixture was kept at 10° to 15° C. and while stirring, there were added dropwise 200 grams of methane sulfonyl chloride. Stirring was continued while maintaining a reaction temperature not exceeding 15° C., for a period of 24 hours, after which the reaction mixture was poured onto ice and the insoluble polyvinyl sulfonate which separated was filtered off, washed with water and dried. It was redissolved in moist acetone, the solution filtered, reprecipitated into water, washed and dried. Analysis of this product gave by weight 24.5% of sulfur corresponding to approximately 93.4% by weight of vinyl methane sulfonate units in the product. This is equivalent to approximately 83.6 mol per cent.

Example 4

22 grams of polyvinyl alcohol were dissolved in 160 grams of benzene sulfonic acid monohydrate. The solution obtained was poured into 1500 cc. of pyridine. The mixture was then distilled until the temperature rose to 112° C., in order to remove all the water. At this point, the distillation was discontinued, the mixture cooled to 5° to 10° C., and while stirring, there were added dropwise to the cooled mixture 200 grams of benzene sulfonyl chloride. The reaction mixture was stirred, while maintaining a reaction temperature not exceeding 15° C., for a period of 24 hours, after which it was poured into water. The polyvinyl benzene sulfonate which came out of solution as a precipitate was filtered off, washed in water and dried. It was then purified by dissolving in acetone, filtering the acetone solution, and reprecipitated in water and dried. Analysis of the purified product gave a sulfur content of 15.4% which indicated that it contained approximately 90% by weight of vinyl benzene sulfonate units or approximately 68 mol percent.

Example 5

22 grams of polyvinyl alcohol were dissolved by stirring into 200 cc. of ethane sulfonic acid, which was cooled in an ice-water bath. The dope thus formed was poured into pyridine, whereby the polyvinyl alcohol and the pyridine salt of ethane sulfonic acid were precipitated. The latter was removed by continuous extraction of the precipitate with pyridine in a modified Soxhlet extractor. The extracted polyvinyl alcohol precipitate was then mixed with one liter of pyridine, placed in a three-necked flack equipped with a mechanical stirrer, a thermometer and a dropping funnel. The mixture was cooled to 5° C and 176 grams of benzene sulfonyl chloride added over a 15 minute period. The reaction mixture was then stirred, while maintaining the reaction mixture at a temperature of from 10° to 15° C. for a period of 24 hours. At the end of this time, an equal volume of acetone was added, the reaction mixture was poured into water and the polyvinyl benzene sulfonate which precipitated was filtered off, leached in water and dried. It was then dissolved in acetone, the acetone solution filtered, and reprecipitated into water, filtered off, leached in water and dried. Analysis gave sulfur equal to 15.7% This is equivalent to about 91 weight percent or 71 mol percent of vinyl benzene sulfonate units.

Example 6

22 grams of polyvinyl alcohol were dissolved by stirring into 200 cc. of ethane sulfonic acid, which was cooled in an ice-water bath. The viscous dope thus formed was precipitated into pyridine and the precipitate extracted, and then sulfonated with 100 grams of ethane sulfonyl chloride following the procedure described in Example 5. The polyvinyl ethane sulfonate obtained on analysis gave 21.2% sulfur which is equivalent to 90 weight percent or 76 mol percent.

Example 7

30 grams of polyvinyl benzene sulfonate prepared as described in Example 5 were thoroughly dried over $P_2O_5$ in vacuum at room temperature. The dried sulfonate compound was then placed in a flask bottle, 150 cc. of piperidine added and the flask evacuated, then nitrogen filled and stoppered. The mixture in the flask was kept at a temperature of 50° C. for a period of six days. At the end of this time, the solution which had formed was filtered and then precipitated into water. The aminated product which separated as a precipitate was yellow in color. It was leached in water, dried, dissolved in ether, filtered, and reprecipitated by pouring the ether solution into water. The aminated product was again leached in water and dried. It was insoluble in water, but soluble in dilute acids. Analysis of the purified product gave by weight 72.3% carbon, 10.4% hydrogen, 8.1% nitrogen and only a trace of sulfur, indicating thereby that substantially all of the sulfonate groups had been replaced by piperidyl groups.

The invention is not limited to the specific compounds of the examples, since any polyvinyl sulfonate in which R is an alkyl, aryl or aralkyl group, as previously defined, can be prepared by the processes described in the examples. Other polyvinyl sulfonates which were prepared were polyvinyl propane sulfonate, polyvinyl butane sulfonate, polyvinyl p-nitrobenzene sulfonate, polyvinyl p-bromobenzene sulfonate, polyvinyl naphthalene sulfonate, polyvinyl phenylethane sulfonate, polyvinyl phenylmethane sulfonate, and the like.

The degree of sulfonation obtained by the method of the invention cannot be increased by resulfonation. For example, when the polyvinyl p-toluene sulfonate of Example 2 was dissolved in pyridine, cooled 5° to 10° C., and stirred with an excess of p-toluene sulfonyl chloride for a period of 24 hours, there was no increase in the sulfur content. This result was found to be true for all the other polyvinyl sulfonates prepared as described in the preceding examples, indicating thereby that the sulfonation of the remaining hydroxyl groups was apparently hindered by steric effects.

We claim:

1. A process for preparing a polyvinyl sulfonate comprising dissolving polyvinyl alcohol in a solvent selected from the group consisting of water, an alkyl sulfonic acid, an aryl sulfonic acid, a mixture of water and an alkyl sulfonic acid and a mixture of water and an aryl sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating agent selected from the group consisting of compounds having the general formula:

$$R-SO_2-Cl$$

wherein R represents a member selected from the group consisting of an alkyl group, an aryl group, a p-nitrophenyl group, a p-bromophenyl group and an aralkyl group, while maintaining the temperature of the resulting reaction mixture at from 0° to 20° C. during the reaction.

2. A process for preparing a polyvinyl sulfonate comprising dissolving polyvinyl alcohol in water, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating agent selected from the group consisting of compounds having the general formula:

$$R-SO_2-Cl$$

wherein R represents an alkyl group, while maintaining the temperature of the resulting reaction mixture at from 0° to 20° C. during the reaction.

3. A process for preparing a polyvinyl sulfonate comprising dissolving polyvinyl alcohol in an alkyl sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating reagent selected from the group consisting of compounds having the general formula:

$$R-SO_2-Cl$$

wherein R represents an aryl group, while maintaining the temperature of the resulting reaction mixture at from 0° to 20° C. during the reaction.

4. A process for preparing a polyvinyl sulfonate comprising dissolving polyvinyl alcohol in an aryl sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating agent selected from the group of compounds having the general formula:

$$R-SO_2-Cl$$

wherein R represents an aryl group, while maintaining the temperature of the resulting reaction mixture at from 0° to 20° C. during the reaction.

5. A process for preparing polyvinyl methane sulfonate comprising dissolving polyvinyl alcohol in water, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension methane, sulfonyl chloride, while maintaining the temperature of the resulting reaction mixture at from 0° to 20° C. during the reaction.

6. A process for preparing polyvinyl benzene sulfonate comprising dissolving polyvinyl alcohol in ethane sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension benzene sulfonyl chloride, while maintaining the temperature of the resulting reaction mixture at from 0° to 20° C. during the reaction.

7. A process for preparing polyvinyl benzene sulfonate comprising dissolving polyvinyl alcohol in benzene sulfonic acid monohydrate, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled solution benzene sulfonyl chloride, while maintaining the temperature of the resulting reaction mixture at from 0° to 20° C. during the reaction.

8. A process for preparing a polyvinyl sulfonate comprising dissolving polyvinyl alcohol in an alkyl sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating agent selected from the group consisting of compounds having the general formula:

$$R-SO_2-Cl$$

wherein R represents an alkyl group, while maintaining the temperature of the resulting reaction mixture at from 0° to 20° C. during the reaction.

9. A process for preparing polyvinyl ethane sulfonate comprising dissolving polyvinyl alcohol in ethane sulfonic acid, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension ethane sulfonyl chloride, while maintaining the temperature of the resulting reaction mixture at from 0° to 20° C. during the reaction.

10. A process for preparing polyvinyl sulfonate comprising dissolving polyvinyl alcohol in water, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension a sulfonating agent selected from the group consisting of compounds having the general formula:

$$R-SO_2-Cl$$

wherein R represents an aryl group, while maintaining the temperature of the resulting reaction mixture at from 0° to 20° C. during the reaction.

11. A process for preparing polyvinyl p-toluene sulfonate comprising dissolving polyvinyl alcohol in water, precipitating the polyvinyl alcohol by adding the resulting solution to pyridine, separating the precipitated polyvinyl alcohol, suspending the polyvinyl alcohol in substantially dry pyridine, cooling the resulting suspension of the polyvinyl alcohol to from 0° to 20° C., then adding to the cooled suspension p-toluene sulfonyl chloride, while maintaining the temperature of the resulting reaction mixture at from 0° to 20° C. during the reaction.

DELBERT D. REYNOLDS.
WILLIAM O. KENYON.

REFERENCES CITED

The following references are of record in the file of this patent:

UNITED STATES PATENTS

| Number | Name | Date |
| --- | --- | --- |
| 2,395,347 | Sharkey | Feb. 19, 1946 |

OTHER REFERENCES

Izard: Industrial and Engineering Chemistry, vol. 41, pages 617–621, March 1949.